(12) United States Patent
Mathis (10) Patent No.: US 8,121,736 B1
(45) Date of Patent: Feb. 21, 2012

(54) AIR SPINDLE WITH CLOSED LOOP SPEED CONTROL

(75) Inventor: Dennis R. Mathis, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 330 days.

(21) Appl. No.: 12/537,313

(22) Filed: Aug. 7, 2009

(51) Int. Cl.
*G05D 7/00* (2006.01)

(52) U.S. Cl. .................................... 700/282; 700/290

(58) Field of Classification Search .................... 700/282
See application file for complete search history.

(56) References Cited

U.S. PATENT DOCUMENTS

| | | | | |
|---|---|---|---|---|
| 4,310,269 A | * | 1/1982 | Neu et al. | 408/11 |
| 4,453,868 A | * | 6/1984 | Winslow | 408/138 |
| 4,476,942 A | * | 10/1984 | Elkin | 173/169 |
| 5,174,690 A | * | 12/1992 | Targett et al. | 408/1 R |
| 5,689,434 A | * | 11/1997 | Tambini et al. | 700/282 |
| 5,799,688 A | * | 9/1998 | Yie | 137/505.13 |
| 5,823,774 A | * | 10/1998 | Abbott et al. | 433/115 |
| 5,901,809 A | * | 5/1999 | Berkun | 180/301 |
| 5,927,910 A | * | 7/1999 | Fix, Jr. | 408/17 |
| 6,227,307 B1 | * | 5/2001 | Lee | 173/78 |
| 6,302,129 B1 | * | 10/2001 | Van Dewerker | 137/12 |
| 7,614,832 B2 | * | 11/2009 | Nappier et al. | 408/10 |
| 2002/0131833 A1 | * | 9/2002 | Born | 408/97 |
| 2003/0202852 A1 | * | 10/2003 | Born | 408/130 |
| 2006/0104734 A1 | * | 5/2006 | Mathis et al. | 408/236 |
| 2007/0147968 A1 | * | 6/2007 | Nappier et al. | 408/130 |
| 2008/0232914 A1 | * | 9/2008 | Mathis | 408/130 |
| 2009/0214307 A1 | * | 8/2009 | Nguyen | 408/56 |

\* cited by examiner

*Primary Examiner* — Albert Decady
*Assistant Examiner* — Anthony Whittington
(74) *Attorney, Agent, or Firm* — Yee & Associates, P.C.

(57) ABSTRACT

A method and apparatus for controlling an air motor. Speed information is received for an operation using an apparatus comprising the air motor having an inlet and an exhaust, and a valve comprising a body with a first port, a second port, and a third port. The first port is connected to the air motor, the second port is configured for connection to an air supply, and the third port is configured to vent air out of the body. A first flow of air is controlled in the body between the first port and the second port and a second flow of air is controlled out of the body through the third port to control a speed of the operation.

20 Claims, 8 Drawing Sheets

AIR SPINDLE WITH CLOSED LOOP SPEED CONTROL

BACKGROUND INFORMATION

1. Field

The present disclosure relates generally to manufacturing and, in particular, to a method and apparatus for performing drilling operations. Still more particularly, the present disclosure relates to a method and apparatus for performing drilling operations using air-powered drills.

2. Background

In manufacturing aircraft, the structures and substructures of an aircraft may be constructed by assembling and attaching parts to each other. Structural parts such as, for example, without limitation, spars, ribs, and other suitable structures may be assembled to form wings, a fuselage, stabilizers, and other suitable structures for an aircraft. The different parts are often assembled using fasteners or other similar types of connecting mechanisms. In fastening one part to another part, holes may be drilled through those parts. Fasteners are placed through the holes to secure the parts to each other. For example, holes may be drilled through a spar and a skin panel. The skin panel may then be attached to the spar using fasteners. Thousands of holes may be drilled during the process of manufacturing an aircraft.

These operations may be performed using a drill. A drill is a tool with a rotating bit for drilling holes in various materials. A drill may be powered in a number of different ways. For example, a drill may be powered using an electric motor or an air motor.

In drilling holes during manufacturing of an aircraft, air-powered drills are often used. An air-powered drill is designed to operate at one speed. Reducing and/or controlling drill speed by partially engaging the trigger of the drill is difficult. Further, partial engagement of the trigger is not allowed by current aircraft manufacturing specifications. If an application requires a different speed for drilling a hole, then a different drill motor may be used or the speed of the air drill may be changed by changing the gear system for the drill.

Changing the output gear ratio in the gear system or the spindle system cannot be performed during the drilling process. This change may be performed between drilling operations. Although changing the gear system allows for changing the speed of the air-powered drill, this process may be time consuming and limited in application. For example, as the drill feed rate is varied or as the drill enters or exits the material, the torque load experienced by the drill also varies. This variation in torque and subsequent variation in speed may be undesirable when working with some materials.

Another solution is to use a mechanical governor with spinning weights and springs. To change speeds, the gears and/or weights and springs in this assembly are changed. This type of mechanism can be used to maintain a constant speed under varying torque loads. This type of mechanism cannot be changed during drilling operations. Thus, the time needed to perform multiple drilling operations may be increased by the time needed to change the speed of the air-powered drill.

Thus, it would be advantageous to have a method and apparatus that takes into account one or more of the issues discussed above, as well as possibly other issues.

SUMMARY

In one advantageous embodiment, an apparatus comprises an air motor, a valve, and a controller. The air motor has an inlet and an exhaust. The valve comprises a body with a first port, a second port, and a third port. The first port is connected to the air motor, the second port is configured for connection to an air supply, and the third port is configured to vent air out of the body. The controller is configured to control a first flow of the air in the body between the first port and the second port and a second flow of the air out of the body through the third port.

In another advantageous embodiment, a method is present for controlling an air motor. Speed information is received for an operation using an apparatus comprising the air motor having an inlet and an exhaust, and a valve. The valve comprises a body with a first port, a second port, and a third port. The first port is connected to the air motor, the second port is configured for connection to an air supply, and the third port is configured to vent air out of the body. A first flow of the air is controlled in the body between the first port and the second port, and a second flow of the air is controlled out of the body through the third port to control a speed of the operation.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
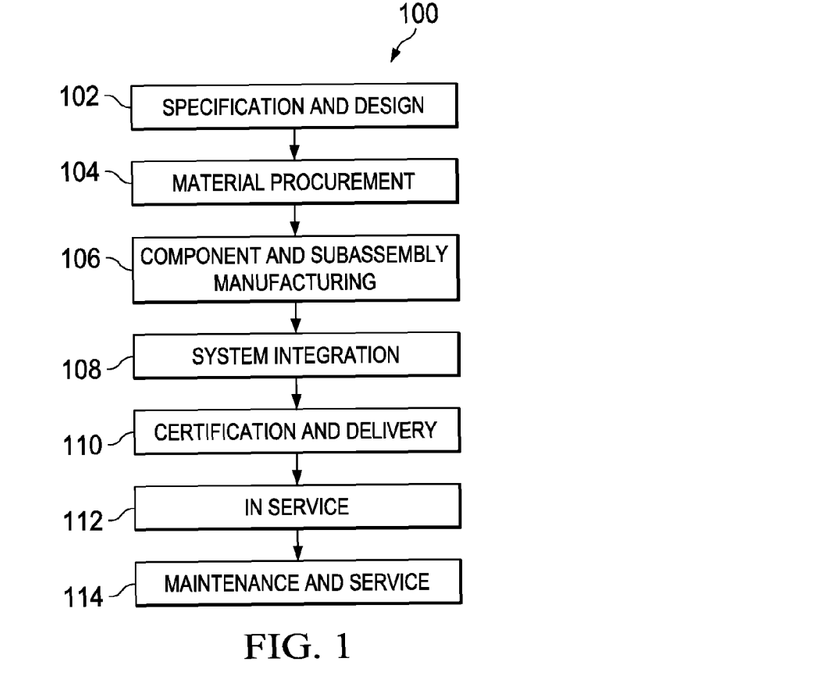
FIG. 1 is a diagram illustrating an aircraft manufacturing and service method in accordance with an advantageous embodiment.
Figure 2:
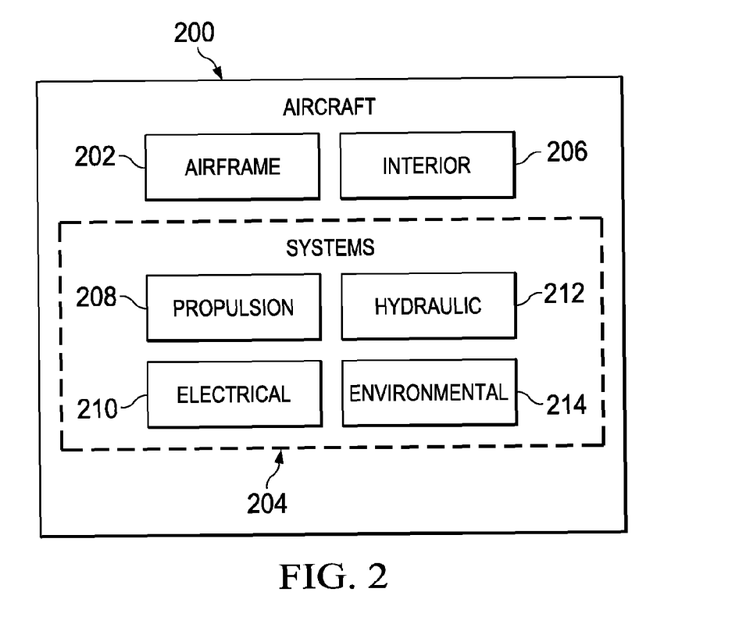
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments may be one or more apparatus embodiments. A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of or reduce the cost of aircraft 200.

The different advantageous embodiments recognize and take into account a number of considerations. For example, the different advantageous embodiments recognize and take into account that the time needed to change the speed at which an air-powered drill operates in between drilling operations may increase the time needed to assemble platforms, such as an aircraft.

The different advantageous embodiments recognize and take into account that a manual valve or regulator may be used to change the speed of an air motor in an air-powered drill. This type of mechanism, however, may limit the power of the drill. Further, this type of mechanism may be unable to regulate speed with varying torque loads that may occur during the drilling of a workpiece. A workpiece may be a plurality of layers through which a hole is drilled. These layers may include varying types of materials, such as titanium, composite materials, air layers, aluminum, and/or other suitable materials.

The different advantageous embodiments recognize and take into account that different torque loads may occur through different layers within a workpiece. The different advantageous embodiments recognize and take into account that a proportional valve may be used to change the speed of an air motor.

The different advantageous embodiments also recognize and take into account that with appropriate feedback and control systems, a proportional valve may be used to regulate the speed of an air motor. The different advantageous embodiments recognize and take into account that regulating the speed of an air motor may be difficult under varying loads that may occur. In the different advantageous embodiments, these loads are torque loads.

The different advantageous embodiments also recognize and take into account that these varying loads may occur because the air is compressible. For example, if the speed of an air motor is to be decreased, the air supply to the air motor may be reduced. The different advantageous embodiments recognize and take into account that even though the air supply may be reduced to the air motor, air is already present within the air line leading to the motor at a pressure level.

This pressure level takes time to reduce to provide a corresponding reduction in the speed of the air motor. The different advantageous embodiments recognize and take into account that the use of a proportional valve to increase or decrease the air supply to an air motor may not provide changes in air pressure as quickly as desired. Quick changes in air pressure may be desired to provide precise speed regulation under varying loads.

Thus, the different advantageous embodiments provide a method and apparatus for performing operations using an air motor. In one advantageous embodiment, an apparatus has an air motor having an inlet and an exhaust, a valve comprising a body with a first port, a second port, and a third port, and a controller.

The first port of the valve is connected to the air motor, the second port is configured for connection to an air supply, and the third port is configured to vent air out of the body of the valve. The controller is configured to control a first flow of the air through the body between the first port and the second port, and a second flow of the air out of the body through the third port.

In this and at least some of the other advantageous embodiments, a valve is a three-way proportional valve. In other words, the valve may have three ports. Further, with a proportional valve, the flow of air through the body may be controlled to provide different levels of flow as opposed to a completely on-and-off type of flow.

Figure 3:
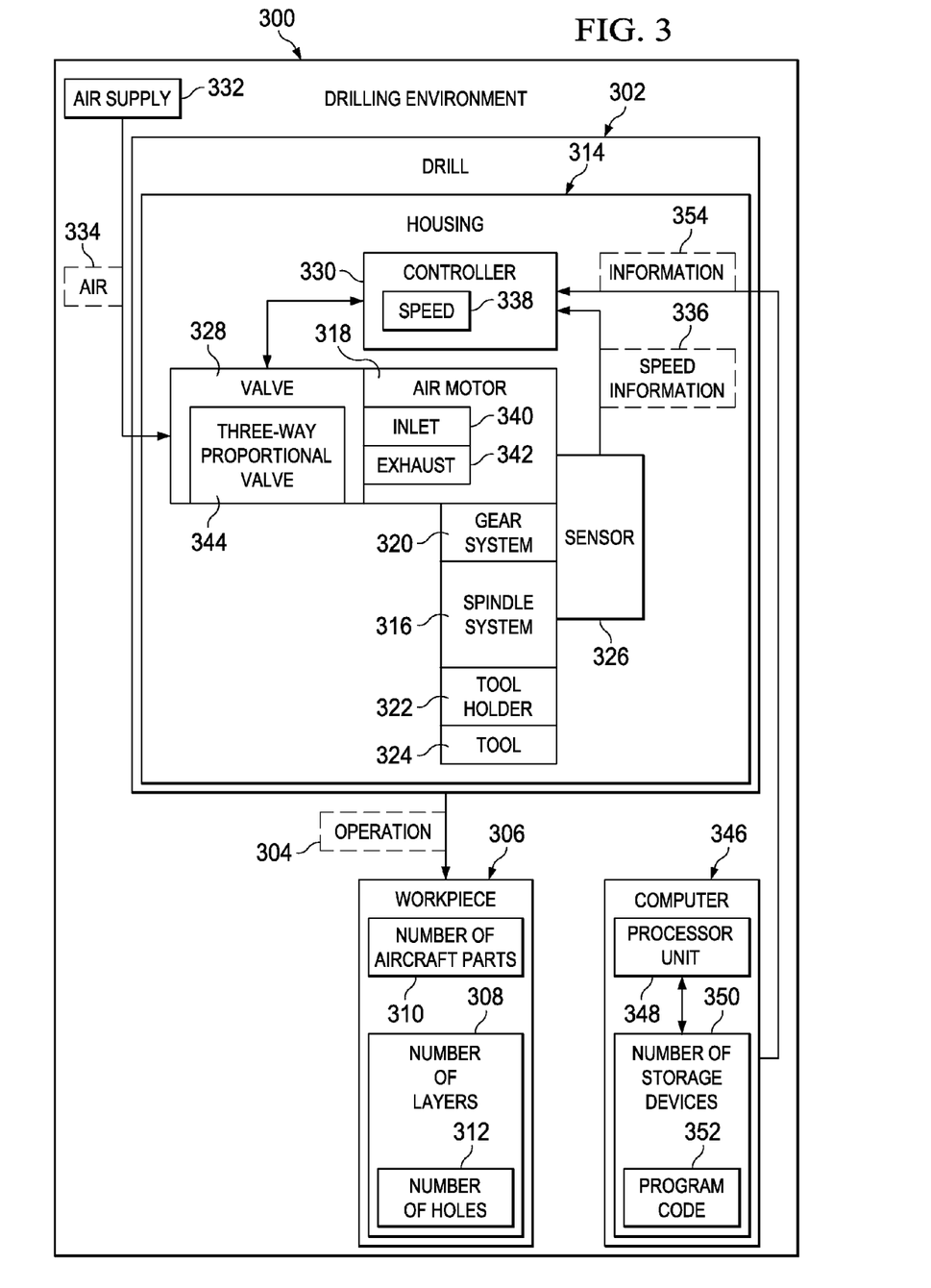
FIG. 3 is a diagram of a drilling environment in accordance with an advantageous embodiment.

Turning now to FIG. 3, a diagram of a drilling environment is depicted in accordance with an advantageous embodiment. Drilling environment 300 is an example of an environment in which operations in the form of drilling operations may be performed using one or more of the different advantageous embodiments to manufacture aircraft 200 in FIG. 2.

In this illustrative example, drill 302 may be used to perform operation 304 on workpiece 306. Workpiece 306 may have number of layers 308. Layers within number of layers 308 may have different materials. For example, materials that may be found in number of layers 308 include composite materials, titanium, air, aluminum, steel, plastic, and other suitable materials. Workpiece 306 may be, for example, number of aircraft parts 310 through which number of holes 312 are to be drilled.

In this example, operation 304 takes the form of a drilling operation. Of course, operation 304 may take other forms, depending on the particular implementation. For example, operation 304 may be a sanding operation, a fastening operation, or some other suitable operation that may be performed using drill 302. Number of aircraft parts 310 may be, for example, at least one of a skin panel, a spar, a rib, and/or some other suitable type of part.

In this illustrative example, drill 302 may include housing 314, spindle system 316, air motor 318, gear system 320, tool holder 322, tool 324, sensor 326, valve 328, and/or other suitable components. Drill 302 may be connected to air supply 332 to perform operation 304. Air supply 332 may supply air 334 to air motor 318.

Air motor 318 may provide mechanical energy to spindle system 316 through gear system 320. Gear system 320 may change the rotational speed of air motor 318 to a suitable speed for spindle system 316. In other words, gear system 320 may provide a ratio to scale down the speed range of air motor 318. Spindle system 316 is a number of components that may provide rotational movement and lateral support to rotate tool holder 322. Tool holder 322 holds tool 324 during the performance of operation 304.

Sensor 326 provides speed information 336 to controller 330. In these illustrative examples, sensor 326 may take various forms. For example, sensor 326 may be an encoder associated with the speed of rotation of spindle system 316, gear system 320, air motor 318, or some other suitable component within drill 302. In these examples, speed information 336 may be measured in revolutions per minute.

With speed information 336, controller 330 may identify speed 338 for operation 304. Controller 330 may maintain speed 338 at a constant speed during the performance of operation 304 in workpiece 306. Further, controller 330 also may change speed 338 based on speed information 336 to difference values, depending on the layer in number of layers 308, in which operation 304 is being performed. In other words, a slower speed may be performed for a layer containing titanium as compared to a layer containing aluminum.

Controller 330 controls the operation of valve 328 in these illustrative examples. Valve 328 controls at least one of air 334 being supplied to air motor 318 and being vented out of air motor 318.

In these illustrative examples, valve 328 may be connected to one of inlet 340 and exhaust 342 for air motor 318. When valve 328 is connected to inlet 340, valve 328 controls air 334 supplied to inlet 340. When valve 328 is connected to exhaust 342, valve 328 controls the venting or exhausting of air 334 from air motor 318.

Controller 330 operates valve 328 to control air 334 being sent to inlet 340 and/or air 334 being sent out of exhaust 342. When valve 328 takes the form of three-way proportional valve 344, controller 330 may more precisely and/or more quickly control speed 338 in one or more of the different advantageous embodiments.

In these illustrative examples, controller 330 may be preprogrammed with one or more speeds for use in controlling speed 338 during operation 304. Controller 330 is programmed via computer 346 in these illustrative examples.

Computer 346 includes processor unit 348 and number of storage devices 350. Number of storage devices 350 may take various forms. For example, without limitation, number of storage devices 350 may include random access memory, read-only memory, a solid state drive, a hard disk drive, a digital versatile disk drive, a removable flash drive, or some other type of storage device.

Program code 352 may be located on number of storage devices 350 for execution by processor unit 348. Processor unit 348 may execute program code 352 to generate information 354. Information 354 may be, for example, without limitation, data, instructions, commands, and other suitable types of information. Information 354 is sent to controller 330, in these illustrative examples, to control the operation of drill 302 during operation 304. Of course, in some advantageous embodiments, computer 346 may be in communication with controller 330 during the performance of operation 304.

The illustration of drilling environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some advantageous embodiments, drilling environment 300 may include additional drills in addition to drill 302. In still other advantageous embodiments, controller 330 may be located remotely to housing 314 and/or drill 302. Further, in yet other advantageous embodiments, controller 330 may be contained in valve 328.

Figure 4:
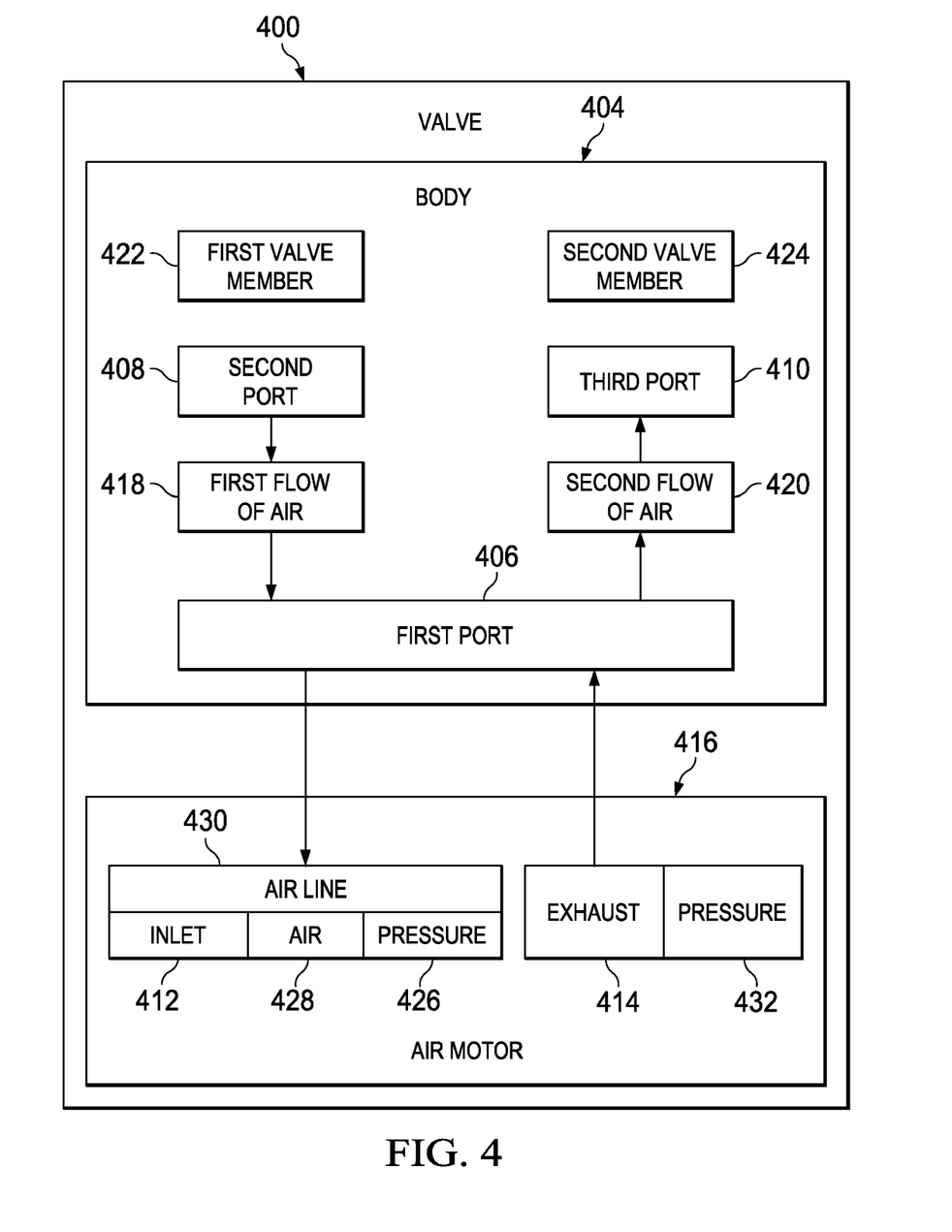
FIG. 4 is a diagram of a valve in accordance with an advantageous embodiment.

With reference now to FIG. 4, a diagram of a valve is depicted in accordance with an advantageous embodiment. Valve 400 is an example of one implementation for valve 328 in FIG. 3 in these illustrative examples. Further, valve 400 is a three-way proportional valve. In other words, valve 400 has three ports, and the flow of air through valve 400 may be controlled at different levels as opposed to a completely on or off level.

In this illustrative example, valve 400 comprises body 404. Body 404 includes first port 406, second port 408, and third port 410. In this illustrative example, first port 406 may be connected to either inlet 412 or exhaust 414 for air motor 416. In other words, the connection of first port 406 to inlet 412 and the connection of first port 406 to exhaust 414 are mutually exclusive. Air motor 416 may be an example of air motor 318 in FIG. 3.

Valve 400 may be operated to control first flow of air 418 between first port 406 and second port 408. Further, valve 400 also may be operated to control second flow of air 420 out of body 404 through third port 410.

In these illustrative examples, the control of first flow of air 418 and second flow of air 420 may be performed by controlling the movement of first valve member 422 and second valve member 424 in body 404 to different positions.

For example, when first port 406 is connected to inlet 412 of air motor 416, first valve member 422 may be moved to a position to increase first flow of air 418 into second port 408 of body 404 from the air supply to first port 406. This operation may be performed in response to the speed of an operation being performed by the drill being below a desired level.

When the speed of an operation is above a desired level, first valve member 422 may be moved to decrease first flow of air 418 into second port 408 through body 404 to first port 406. Additionally, second valve member 424 may be moved to increase second flow of air 420 out of body 404 through third port 410 by venting air in addition to decreasing the supply of air pressure in air motor 416. This pressure may be present in air line 430 and/or air motor 416. The operation of first valve member 422 and second valve member 424 may occur constantly during the performance of an operation, such as a drilling operation, to maintain a desired speed for the drilling operation.

In some advantageous embodiments, first port 406 may be connected to exhaust 414 instead of inlet 412 for air motor 416. With this type of configuration, when the speed of an operation is below a desired level, second flow of air 420 may be increased by moving second valve member 424 in a manner that increases second flow of air 420 out of body 404 through third port 410. By increasing second flow of air 420, air motor 416 moves faster in response to the same pressure being applied to inlet 412.

If the speed of the operation increases above a desired value, the speed of air motor 416 is decreased. Second flow of air 420 may be decreased by moving second valve member 424 such that second flow of air 420 out of body 404 through third port 410 is decreased. Additionally, first valve member 422 may be moved to change first flow of air 418 such that pressure 432 of air 428 at exhaust 414 of air motor 416 increases. Changing first flow of air 418 to increase pressure 426 causes pressure to increase faster than by just decreasing second flow of air 420.

In these examples, second port 408 is connected to an air supply. By allowing first flow of air 418 to increase pressure 432 at exhaust 414, the speed of air motor 416 slows down.

In these advantageous embodiments, currently available valves may be used to implement valve 400. As one example, a valve from the "P3HPA"/"P3KNA" Series of electronic proportional regulators manufactured by Parker Hannifin Corporation may be used for valve 400. A proportional pressure solenoid valve from the VP21 Series of valves manufactured by Norgren Ltd. may also be used for valve 400.

In some advantageous embodiments, valve 400 may be a functional three-port valve formed by two two-port valves connected in parallel. For example, two VEF2131 electro-pneumatic proportional flow control valves, manufactured by the SMC Corporation of America, may be used. These valves may be connected in parallel with the connected ports forming first port 406.

Figure 5:
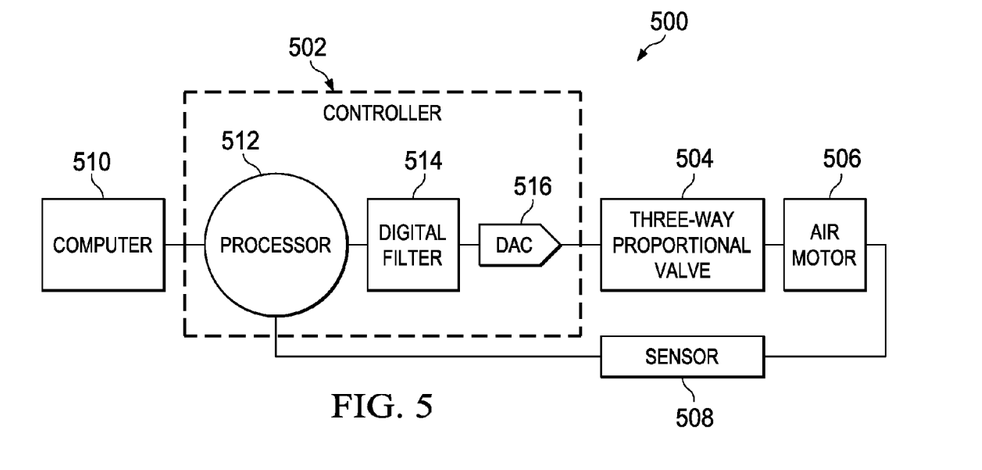
FIG. 5 is a high-level diagram of a feedback system in accordance with an advantageous embodiment.

Turning now to FIG. 5, a high-level diagram of a feedback system is depicted in accordance with an advantageous embodiment. In this illustrative example, feedback system 500 is an example of a feedback system that may be implemented in drilling environment 300 to control air motor 318 in drill 302 during the performance of operation 304 in FIG. 3.

In this illustrative example, feedback system 500 includes controller 502, three-way proportional valve 504, air motor 506, sensor 508, and computer 510.

Controller 502, in this illustrative example, includes processor 512, digital filter 514, and digital-to-analog converter (DAC) 516. Computer 510 may set values for the speed of operation needed. These values may be set in between the performance of operations or while the operations are being performed. Processor 512 generates information used to control three-way proportional valve 504.

In these illustrative examples, digital filter 514 is a set of control algorithms with a number of input parameters. Digital filter 514 uses these control algorithms to control the response of feedback system 500 to deviations from the desired speed of operation. A proportional-integral-derivative controller may be one example of one implementation for digital filter 514.

Digital-to-analog converter 516 changes the information into one or two signals that are sent to three-way proportional valve 504. Three-way proportional valve 504 controls the air sent to and/or exhausted by air motor 506 in these examples. Three-way proportional valve 504 may have an internal closed-loop pressure control circuit. The speed of the operation being performed using air motor 506 is detected by sensor 508 and that information is sent back to processor 512 in controller 502.

Figure 6:
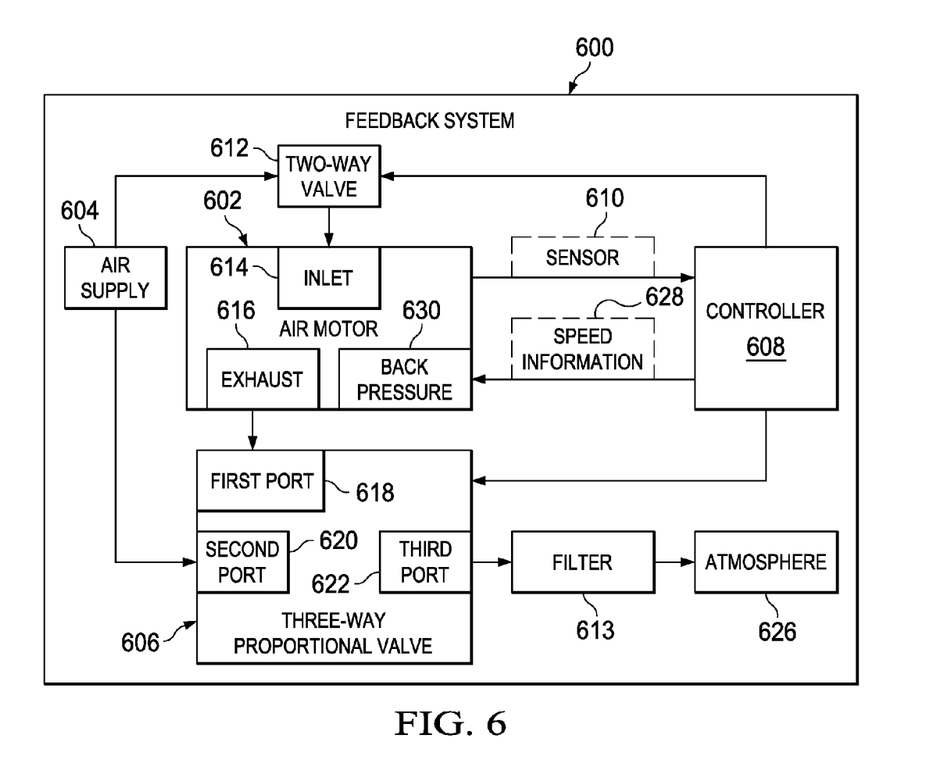
FIG. 6 is a diagram illustrating a feedback system for controlling an air motor in accordance with an advantageous embodiment.

Turning now to FIG. 6, a diagram illustrating a feedback system for controlling an air motor is depicted in accordance with an advantageous embodiment. In this illustrative example, feedback system 600 is an example of a feedback system that may be implemented in drilling environment 300 in FIG. 3. In particular, feedback system 600 may be implemented to control operation 304 of drill 302 in FIG. 3.

In this illustrative example, feedback system 600 includes air motor 602, air supply 604, three-way proportional valve 606, controller 608, sensor 610, two-way valve 612, and filter 613.

In this illustrative example, exhaust 616 in air motor 602 is connected to first port 618 in three-way proportional valve 606. Air supply 604 is connected to two-way valve 612 and second port 620 in three-way proportional valve 606. Third port 622 is connected to filter 613, which leads to atmosphere 626.

In this illustrative example, sensor 610 generates speed information 628. Speed information 628 may be the speed of air motor 602 or data used to calculate the speed of air motor 602. Speed information 628 also may be the speed of other components, such as a spindle driven by air motor 602.

In this illustrative example, two-way valve 612 is an optional valve in feedback system 600. Two-way valve 612 controls the unregulated air sent into air motor 602 from air supply 604. Two-way valve 612 provides air from air supply 604 to inlet 614 during the operation of drill 302. Two-way valve 612 shuts off the supply of air from air supply 604 when drill 302 is not in operation. In this illustrative example, two-way valve 612 may be used as a safety feature when inconsistencies occur with the connection between exhaust 616 to first port 618.

Controller 608 decreases or increases the speed of air motor 602 by operating three-way proportional valve 606 using speed information 628. Additionally, controller 608 also may control the operation of two-way valve 612 in these examples.

In this illustrative example, controller 608 may control the flow of air from exhaust 616 through first port 618 out of third port 622. This flow of air goes through filter 613 and into atmosphere 626. Filter 613 filters out oil aerosols, particles, and/or other undesirable components that may be present in air exhausted by air motor 602. Further, filter 613 also may act as a muffler to reduce the noise generated during drilling operations.

If the speed for the operation is greater than a desired level, controller 608 decreases the flow of air through third port 622 into atmosphere 626. By decreasing this flow of air, back pressure 630 increases in air motor 602, slowing air motor 602.

Back pressure 630 may not increase as quickly as desired through reducing the amount of air flowing from exhaust 616 through first port 618 in three-way proportional valve 606 out of third port 622. This situation may be taken into account by sending air from air supply 604 through second port 620 to first port 618 in a manner that increases back pressure 630 more quickly to reduce the speed of air motor 602.

If the speed of air motor 602 is too slow, controller 608 operates three-way proportional valve 606 to increase the flow of air through first port 618 in three-way proportional valve 606 and out third port 622. This increased flow may decrease back pressure 630. As a result, air motor 602 increases in speed.

Figure 7:
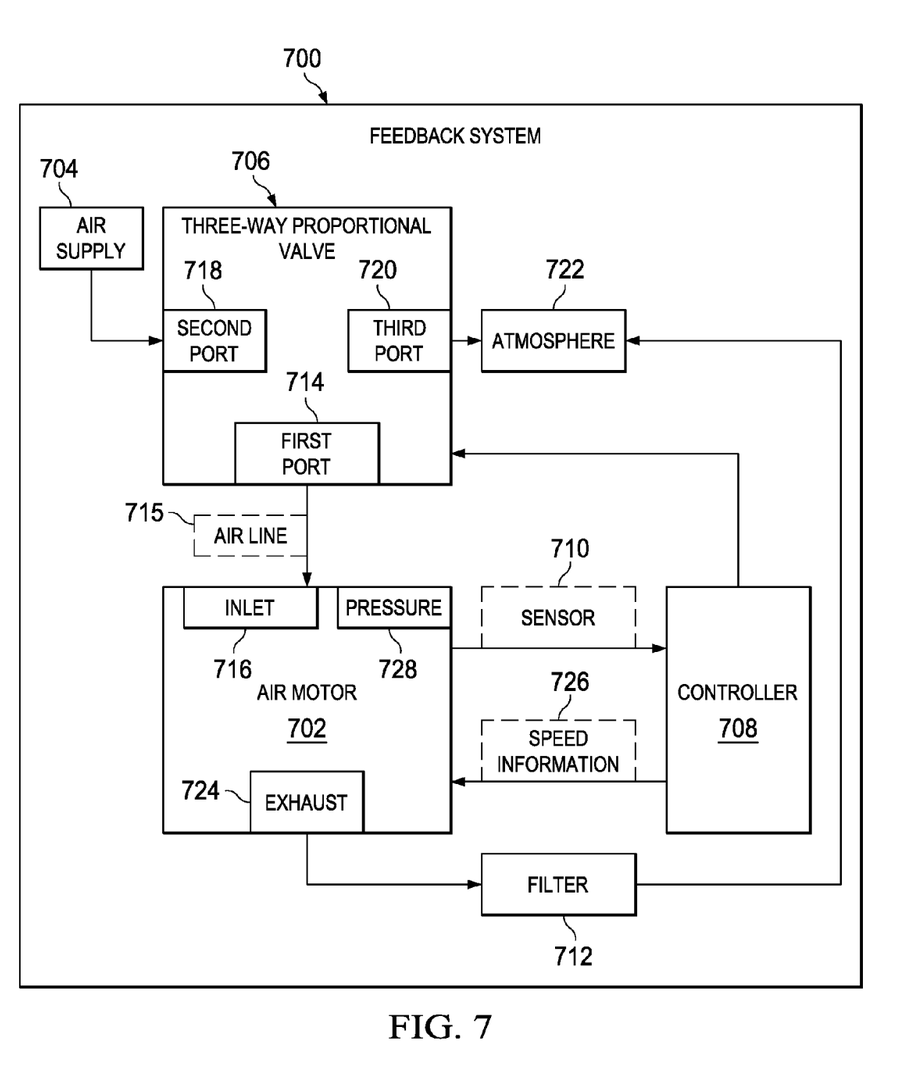
FIG. 7 is a diagram illustrating a feedback system for controlling the operation of a drill in accordance with an advantageous embodiment.

Turning now to FIG. 7, a diagram illustrating a feedback system for controlling the operation of a drill is depicted in accordance with an advantageous embodiment. In this illustrative example, feedback system 700 is an example of a feedback system that may be implemented in drilling environment 300 in FIG. 3. More specifically, feedback system 700 may be used to control drill 302 during operation 304 in FIG. 3.

In this illustrative example, feedback system 700 includes air motor 702, air supply 704, three-way proportional valve 706, controller 708, sensor 710, and filter 712. In this illustrative example, a feedback loop is formed by controller 708, three-way proportional valve 706, air motor 702, and sensor 710.

In this configuration, first port 714 in three-way proportional valve 706 is connected to inlet 716 of air motor 702. Second port 718 in three-way proportional valve 706 is connected to air supply 704. Third port 720 is connected to atmosphere 722. Exhaust 724 in air motor 702 also may vent or exhaust air into atmosphere 722 through filter 712.

Sensor 710 generates speed information 726, which may be used by controller 708 to adjust the speed of air motor 702. If the speed of the operation is below a desired level, controller 708 may control the flow of air through three-way proportional valve 706 into second port 718 and out of first port 714 into inlet 716 of air motor 702. In this manner, the speed of air motor 702 may be increased.

If the speed of the operation is above a desired level, controller 708 may control three-way proportional valve 706 to decrease the flow of air through second port 718 in three-way proportional valve 706 out of first port 714 into air motor 702. By reducing the flow of air into inlet 716 of air motor 702, the speed of air motor 702 may be decreased. Further, pressure 728 may be present in air motor 702 and air line 715 between inlet 716 and first port 714.

This pressure may take time to decrease. The time needed to decrease air motor 702 may be reduced by controller 708 operating three-way proportional valve 706 to increase the flow of air out of third port 720 from three-way proportional valve 706 into atmosphere 722. By increasing the flow of air out of third port 720, pressure 728 may be decreased faster than just waiting for air to be passed through air motor 702 and vented into atmosphere 722 through exhaust 724.

The illustration of feedback system 600 in FIG. 6 and feedback system 700 in FIG. 7 are not meant as architectural or physical limitations to the manner in which other advantageous embodiments may be implemented. For example, in some advantageous embodiments, the sensors may provide speed information about air motor 602 in FIG. 6 indirectly. For example, the speed information may be the revolutions per minute of the tool or spindle system. In yet other advantageous embodiments, some of the components may be unnecessary, such as the two-way valves or the filter.

Figure 8:
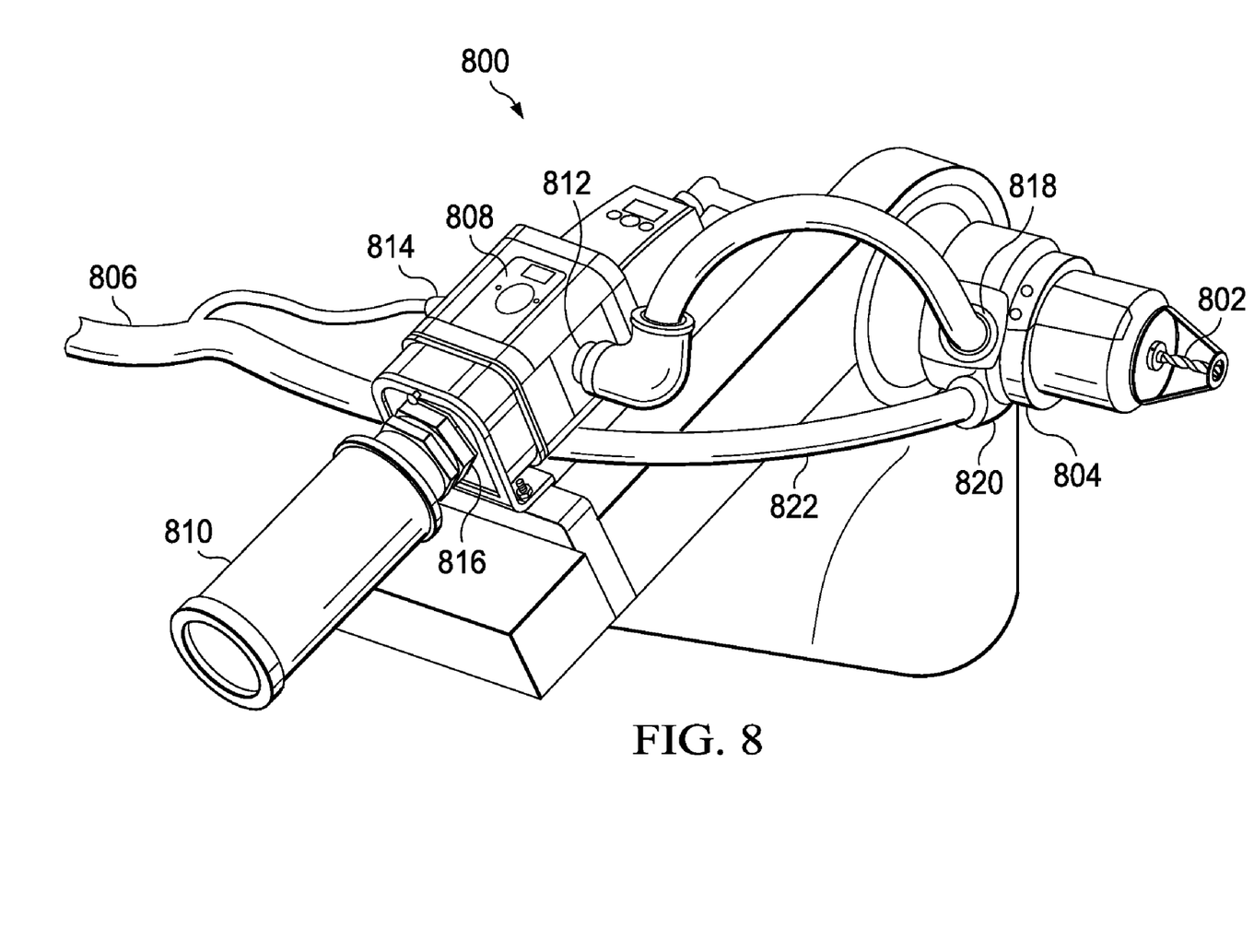
FIG. 8 is an illustration of a feedback system in accordance with an advantageous embodiment.

With reference now to FIG. 8, an illustration of a feedback system is depicted in accordance with an advantageous embodiment. In this illustrative example, feedback system 800 is an example of one implementation for feedback system 600 in FIG. 6. Feedback system 800 may be implemented to control the operation of drill 802.

As depicted, feedback system 800 includes air motor 804, air supply 806, three-way proportional valve 808, and filter 810. Three-way proportional valve 808 has first port 812, second port 814, and third port 816.

Exhaust 818 of air motor 804 is connected to first port 812. Air supply 806 is connected to second port 814. Filter 810 is connected to third port 816. In this illustrative example, filter 810 takes the form of a muffler, which leads out towards the atmosphere.

In this depicted example, air supply 806 also provides air to inlet 820 of air motor 804 through air line 822. Air is provided to inlet 820 by air supply 806 during the operation of drill 802. The flow of air from air supply 806 to air motor 804 may be controlled by a two-way valve, such as two-way valve 612 in FIG. 6. This two-way valve may be a shut-off device that is a safety feature.

In this illustrative example, a controller, such as controller 608 in FIG. 6, and a sensor, such as sensor 610 in FIG. 6, are not seen in this view of feedback system 800. The controller may be used to control air motor 804 by operating three-way proportional valve 808 using speed information generated by the sensor.

The illustration of feedback system 800 in FIG. 8 is not meant to provide architectural or physical limitations to the manner in which other advantageous embodiments may be implemented. For example, in some advantageous embodiments, the controller may be integrated as part of three-way proportional valve 808.

Figure 9:
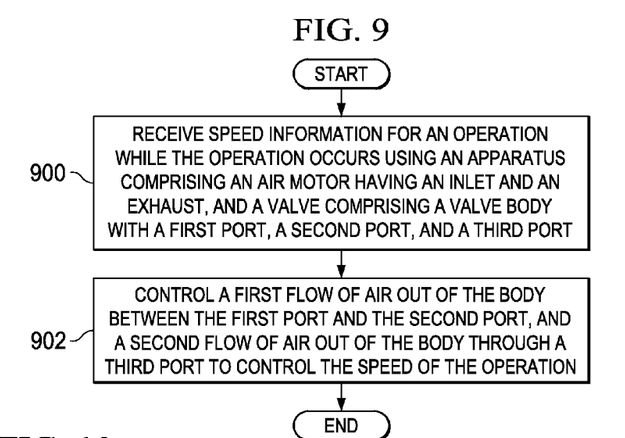
FIG. 9 is a flowchart of a method for controlling an air motor in accordance with an advantageous embodiment.

Turning now to FIG. 9, a flowchart of a method for controlling an air motor is depicted in accordance with an advantageous embodiment. The process illustrated in FIG. 9 may be implemented using drilling environment 300 in FIG. 3. In particular, this process may be implemented to control air motor 318 in drill 302 during the performance of operation 304 on workpiece 306 in FIG. 3.

The process begins by receiving speed information for an operation while the operation occurs using an apparatus comprising an air motor having an inlet and an exhaust, and a valve comprising a valve body with a first port, a second port, and a third port (operation 900). In this example, the process may be implemented in a device, such as controller 330 in FIG. 3. The first port is connected to the air motor, the second port is configured for connection to an air supply, and the third port is configured to vent air out of the body of the valve. Also in this illustrative example, the valve takes the form of a three-way proportional valve.

The process controls a first flow of air out of the body between the first port and the second port, and a second flow of air out of the body through the third port to control the speed of the operation (operation 902), with the process terminating thereafter.

Figure 10:
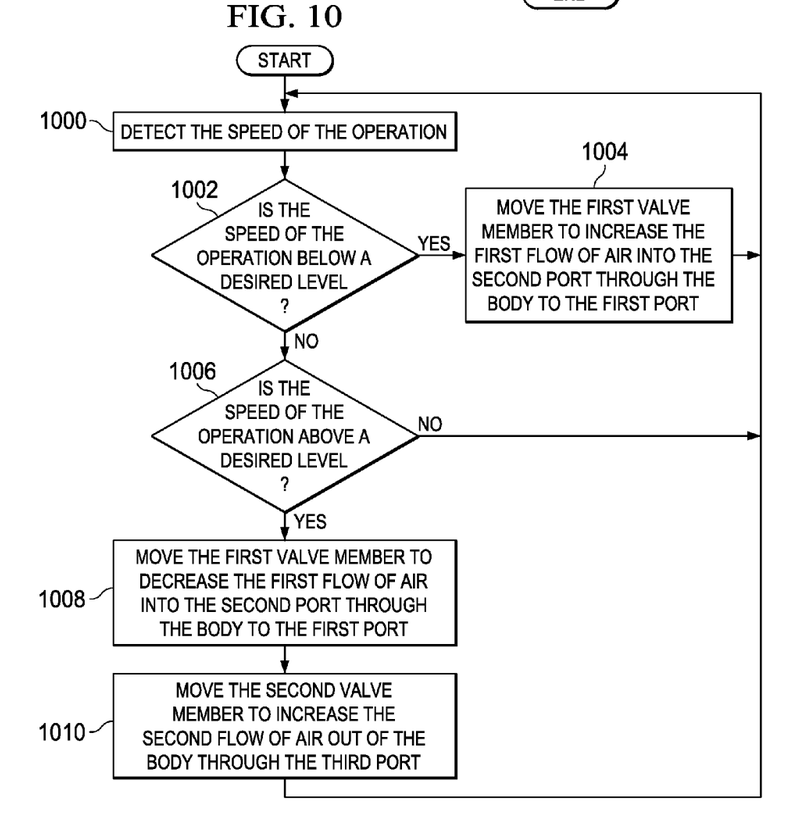
FIG. 10 is a flowchart of a process for controlling a valve in accordance with an advantageous embodiment.

Turning now to FIG. 10, a flowchart of a process for controlling a valve is depicted in accordance with an advantageous embodiment. The process in FIG. 10 may be implemented to control a valve, such as valve 400 in FIG. 4. In this illustrative example, the first port is connected to the inlet of the air motor.

The process begins by detecting the speed of the operation (operation 1000). A determination is made as to whether the speed of the operation is below a desired level (operation 1002). If the speed of the operation is below a desired level, the process moves the first valve member to increase the first flow of air into the second port through the body to the first port (operation 1004), with the process then returning to operation 1000.

With reference again to operation 1002, if the speed of the operation is not below a desired level, a determination is made as to whether the speed of the operation is above a desired level (operation 1006). If the speed of the operation is above a desired level, the process moves the first valve member to decrease the first flow of air into the second port through the body to the first port (operation 1008). Further, the process moves the second valve member to increase the second flow of air out of the body through the third port (operation 1010), with the process then returning to operation 1000.

With reference again to operation 1006, if the speed of the operation is not above a desired level, the process returns to operation 1000.

Figure 11:
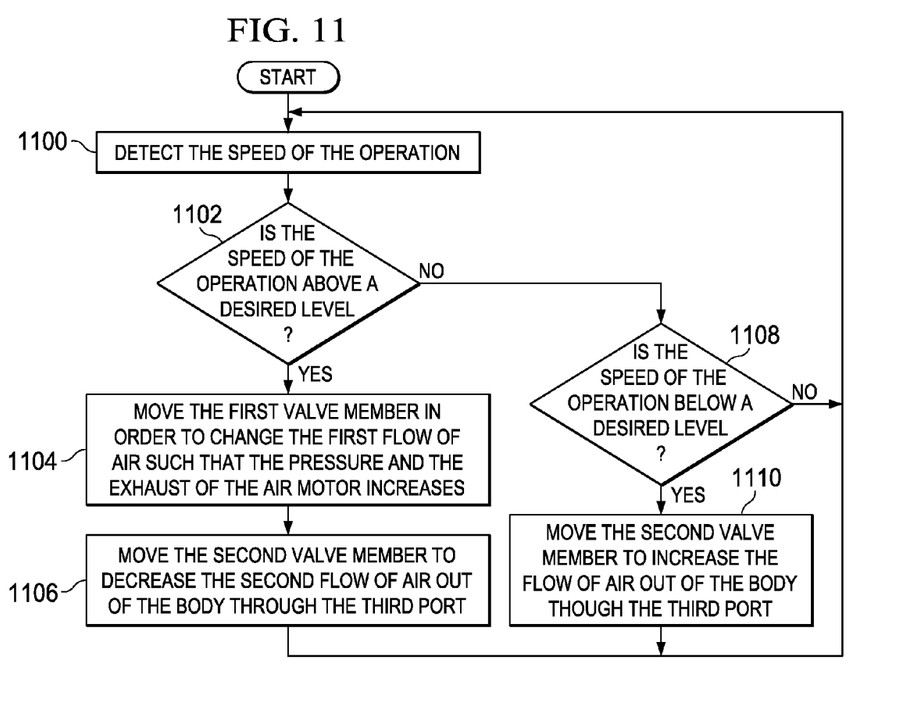
FIG. 11 is a flowchart of a process for controlling a valve in accordance with an advantageous embodiment.

Turning now to FIG. 11, a flowchart of a process for controlling a valve is depicted in accordance with an advantageous embodiment. The process illustrated in FIG. 11 may be implemented using a valve, such as valve 400 in FIG. 4. In this illustrative example, the first port of the valve is connected to the exhaust of the air motor.

The process begins by detecting the speed of the operation (operation 1100). Next, a determination is made as to whether the speed of the operation is above a desired level (operation 1102). If the speed of the operation is above a desired level, the process moves the first valve member in order to change the first flow of air such that the pressure and the exhaust of the air motor increases (operation 1104). The process also moves the second valve member to decrease the second flow of the air out of the body through the third port (operation 1106), with the process then returning to operation 1100.

With reference again to operation 1102, if the speed of the operation is not above a desired level, a determination is made as to whether the speed of the operation is below a desired level (operation 1108). If the speed of the operation is below a desired level, the second valve member is moved to increase the flow of air out of the body through the third port (operation 1110), with the process then returning to operation 1100. With reference again to operation 1108, if the speed of the operation is not below a desired level, the process also returns to operation 1100 as described above.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step.

In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

For example, in some advantageous embodiments, some operations may be omitted. For example, in some advantageous embodiments, operation 1104 in FIG. 11 may be omitted. In these illustrative examples, although operation 1008 is shown as being sequential to operation 1006 in FIG. 10, both operations may be performed simultaneously. In a similar fashion, operation 1004 and operation 1106 in FIG. 11 may be performed at the same time.

Thus, the different advantageous embodiments provide a method and apparatus for controlling the performance of an operation, such as a drilling operation using a drill. In one advantageous embodiment, an apparatus comprises an air motor, a valve, and a controller. The valve is a three-way proportional valve in these examples. The valve may have a body with a first port, a second port, and a third port.

The first port is connected to the air motor, the second port is configured for connection to an air supply, and a third port is configured to vent air out of the body of the valve. The controller is configured to control a first flow of air in the body between the first port and the second port. The controller also is configured to control a second flow of air out of the body through the third port.

The different advantageous embodiments provide a capability to more quickly control the speed of an air motor as compared to currently available drilling systems. In the different advantageous embodiments, a third port may be present to increase the speed at which air is vented from an air motor. The different advantageous embodiments may increase the speed at which a pressure in the air motor may be reduced when the air motor is operating faster than desired. With the different advantageous embodiments, the vent allows for pressure in the air motor to be vented through the port rather than having to wait for the air pressure to reduce by the air being vented through the exhaust of the air motor.

When the valve is connected to the exhaust, the different advantageous embodiments provide a capability to more quickly slow down the speed of an air motor by increasing flow of air from an air supply into a port in the valve. This increased flow of air is controlled to increase the pressure at the exhaust of the air motor. This increased back pressure slows down the air motor more quickly than merely closing or reducing the amount of air vented by the air motor. With the different advantageous embodiments, the speed of a drill may be changed by a factor of five during a drilling operation in less than, for example, without limitation, one second.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

Although the different advantageous embodiments have been described with respect to performing operations on workpieces for aircraft, the different advantageous embodiments also recognize that some advantageous embodiments may be applied to other types of platforms. For example, without limitation, other advantageous embodiments may be applied to a mobile platform, a stationary platform, a land-based structure, an aquatic-based structure, a space-based structure, and/or some other suitable object.

More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    an air motor having an inlet and an exhaust;
    a valve comprising a body with a first port, a second port, and a third port, wherein the first port is connected to the air motor, the second port is configured for connection to an air supply, and the third port is configured to vent air out of the body;

a controller configured to control a first flow of the air in the body between the first port and the second port and a second flow of the air out of the body through the third port;

a first valve member configured to control the first flow of the air through the second port into the body; and a second valve member configured to control the second flow of the air out of the body through the third port;

wherein the first port is connected to the inlet of the air motor, wherein the controller moves the first valve member to increase the first flow of the air into the second port though the body to the first port in response to a speed of an operation being below a desired level, and wherein the controller moves the first valve member to decrease the first flow of the air into the second port though the body to the first port and moves the second valve member to increase the second flow of the air out of the body through the third port in response to the speed of the operation being above the desired level.

2. The apparatus of claim 1, wherein the controller controls the first flow of the air and the second flow of the air in response to a speed of an operation driven by the air motor.

3. The apparatus of claim 2, wherein the controller controls the first flow of the air and the second flow of the air to maintain a constant speed of the operation driven by the air motor.

4. The apparatus of claim 1 further comprising:
a sensor, wherein the sensor detects a speed of an operation.

5. The apparatus of claim 4 further comprising:
a spindle system, wherein the sensor detects a speed at which the spindle system rotates to detect the speed of the operation.

6. The apparatus of claim 4 further comprising:
a gear system, wherein the sensor detects a speed at which a gear in the gear system rotates to detect the speed of the operation.

7. The apparatus of claim 2, wherein the operation is a drilling operation.

8. An apparatus comprising:
an air motor having an inlet and an exhaust;
a valve comprising a body with a first port, a second port, and a third port, wherein the first port is connected to the air motor, the second port is configured for connection to an air supply, and the third port is configured to vent air out of the body;
a controller configured to control a first flow of the air in the body between the first port and the second port and a second flow of the air out of the body through the third port;
a first valve member configured to control the first flow of the air through the second port into the body; and
a second valve member configured to control the second flow of the air out of the body through the third port;
wherein the first port is connected to the exhaust of the air motor, wherein the controller moves the first valve member to change the first flow of the air such that a pressure of air at the exhaust of the air motor increases and moves the second valve member to decrease the second flow of the air out of the body through the third port in response to a speed of an operation being above a desired level, and wherein the controller moves the second valve member to increase the second flow of the air out of the body through the third port in response to the speed of the operation being below the desired level.

9. The apparatus of claim 1, wherein the third port is connected to an air filter.

10. The apparatus of claim 1, wherein the valve is a proportional valve.

11. A method for controlling an air motor, the method comprising:
receiving speed information for an operation using an apparatus comprising the air motor having an inlet and an exhaust, a valve comprising a body with a first port, a second port, and a third port, wherein the first port is connected to the air motor, the second port is configured for connection to an air supply, and the third port is configured to vent air out of the body; and
controlling a first flow of the air in the body between the first port and the second port and a second flow of the air out of the body through the third port to control a speed of the operation;
wherein the step of receiving the speed information for the operation using the apparatus comprising the air motor having the inlet and the exhaust, the valve comprising the body with the first port, the second port, and the third port, wherein the first port is connected to the air motor, the second port is configured for connection to the air supply, and the third port is configured to vent the air out of the body comprises:
receiving the speed information for the operation, while the operation occurs, using the apparatus comprising the air motor having the inlet and the exhaust, the valve comprising the body with the first port, the second port, and the third port, wherein the first port is connected to the air motor, the second port is configured for connection to the air supply, and the third port is configured to vent the air out of the body.

12. The method of claim 11, wherein the controlling step is performed by a controller configured to control the first flow of the air and the second flow of the air in response to the speed of the operation driven by the air motor.

13. The method of claim 11, wherein the controlling step comprises:
controlling the first flow of the air and the second flow of the air to maintain a constant speed of the operation driven by the air motor.

14. The method of claim 11 further comprising:
detecting the speed of the operation using a sensor.

15. The method of claim 14, wherein the apparatus includes a spindle system and wherein the sensor detects a speed at which the spindle system rotates to detect the speed of the operation.

16. The method of claim 14, wherein the apparatus includes a gear system, and wherein the sensor detects a speed at which a gear in the gear system rotates to detect the speed of the operation.

17. The method of claim 11, wherein the operation is a drilling operation.

18. The method of claim 11, wherein the first port is connected to the inlet of the air motor, and wherein the step of controlling the first flow of the air in the body between the first port and the second port and the second flow of the air out of the body through the third port to control the speed of the operation comprises:
moving a first valve member to increase the first flow of the air into the second port through the body to the first port in response to the speed of the operation being below a desired level;
moving the first valve member to decrease the first flow of the air into the second port through the body to the first port in response to the speed of the operation being above the desired level; and moving a second valve member to increase the second flow of the air out of the body through the third port in response to the speed of the operation being above the desired level.

19. The method of claim 18, wherein the first port is connected to the exhaust of the air motor, and wherein the step of controlling the first flow of the air in the body between the first port and the second port and the second flow of the air out of the body through the third port to control the speed of the operation comprises:

moving the first valve member to change the first flow of the air such that a pressure of the air at the exhaust of the air motor increases in response to the speed of the operation being above the desired level;

moving the second valve member to decrease the second flow of the air out of the body through the third port in response to the speed of the operation being above the desired level; and moving the second valve member to increase the second flow of the air out of the body through the third port in response to the speed of the operation being below the desired level.

20. The apparatus of claim 8, wherein the valve is a first valve and further comprising:

a second valve having a body with a first port and a second port, wherein the first port is connected to the inlet of the air motor and the second port is configured for connection to the air supply.

* * * * *